United States Patent [19]

Krupick

[11] Patent Number: 4,464,942

[45] Date of Patent: Aug. 14, 1984

[54] GYROSCOPE HINGE ASSEMBLY WITH ADJUSTABLE AXIAL COMPLIANCE

[75] Inventor: Walter J. Krupick, Succasunna, N.J.

[73] Assignee: The Singer Company, Little Falls, N.J.

[21] Appl. No.: 284,892

[22] Filed: Jul. 20, 1981

[51] Int. Cl.³ .............................................. G01C 19/22
[52] U.S. Cl. ..................................................... 74/5 F
[58] Field of Search ........................... 74/5 F; 464/78; 308/2 A

[56] References Cited

U.S. PATENT DOCUMENTS

| | | | |
|---|---|---|---|
| 3,354,726 | 11/1967 | Krupick et al. | 74/5 F |
| 3,527,062 | 9/1970 | Bilinski et al. | 464/78 |
| 3,529,477 | 9/1970 | Quermann | 74/5 F |
| 3,538,776 | 11/1970 | Macor et al. | 74/5 F |
| 3,614,894 | 10/1971 | Ensinger | 74/5 F |
| 3,709,045 | 1/1973 | Krupick et al. | 74/5 F |
| 4,062,600 | 12/1977 | Wyse | 74/5 F |
| 4,100,813 | 7/1978 | Previte | 74/5 F |
| 4,270,392 | 6/1981 | Krupick | 74/5 F |

Primary Examiner—Rodney H. Bonck
Attorney, Agent, or Firm—Morris Liss; T. W. Kennedy

[57] ABSTRACT

A universal joint hinge assembly for a tuned rotor gyroscope is insensitive to restraint changes due to spin axes accelerations. The hinge assembly is readily trimmable at the gyroscope wheel assembly to permit adjusting of the axial compliance of the gyroscope wheel thereby reducing the rectified torques due to linear acceleration.

3 Claims, 7 Drawing Figures

GYROSCOPE HINGE ASSEMBLY WITH ADJUSTABLE AXIAL COMPLIANCE

FIELD OF THE INVENTION

The present invention relates to universal joint gyroscope flexure hinges.

BACKGROUND OF THE INVENTION

The prior art includes a number of universal joint gyroscope flexure hinges such as exemplified by U.S. Pat. Nos. 3,527,062; 3,538,776; 3,354,726; and 3,709,045, all of which are assigned to the present assignee.

The usual universal flexure hinge of the prior art, and as described in the aforesaid patents, comprises an inner hinge unit and an outer hinge unit, the hinge units being interconnected in a general concentric and parallel manner. Each of the two hinge units of the prior art assemblies is made up of three gimbals, together with two quadrature pairs of appropriately disposed flexure bars which interconnect the three gimbals, and which permit selective tilting of the gimbals about any transverse axis perpendicular to the central axis of the assembly.

The upper gimbals of the two hinge units of the prior art flexure hinge assembly are affixed to one another and to the flywheel of the gyroscope, and the lower gimbals of the two hinge units are connected to one another and to the spin shaft of the gyroscope. The inner hinge unit is constructed to provide axial stiffness along the spin axis of the gyroscope, and the outer hinge unit is constructed to provide the necessary radial and torsional stiffness to the assembly.

A disadvantage inherent in the above-described prior art flexure hinge assemblies is the inability to compensate the structure to eliminate rectified torques resulting from angular vibration inputs about its input axis. As a result, a rectified drift-producing torque will occur when angular vibration inputs about the input axis occur at twice gyroscopic flywheel rotation frequency.

The improvement of U.S. Pat. No. 3,709,045 relates to the construction of a universal joint assembly so that it incorporates compensation weights on a middle inner gimbal and on a middle outer gimbal, so that these gimbals can be adjusted for inertia and mass unbalance to compensate for spring rate torques and effective gimbal unbalance, and to compensate for the angular vibration rectified drift-producing torque. Although the hinge assembly of this patent produces generally satisfactory results, it is burdened with the disadvantage that there is a change in restraint as a result of spin axis acceleration. A wheel tilt combined with spin axis acceleration results in a torque and gyroscope drift. For high performance systems, this condition is not tolerable and must be compensated for at the system level, creating additional cost and potential reliability problems.

The restraint change is due to the inner hinge flexures. When a flexure is loaded in compression, its restraint will decrease and when it is loaded in tension its restraint will increase. For a flat simple flexure the change in restraint is approximately defined by $$e = (PL/3)$$

where
 e = change in restraint
 L = length of flexure
 P = axial load.

In the hinge assembly of the latter-mentioned U.S. patent, all the flexures for the inner hinge are either loaded in compression or tension, depending on load direction. As a result, the full change in restraint is experienced. Further, with the hinge assembly of the last-mentioned patent, it is difficult to trim the axial compliance to make it equal the radial hinge compliance. This equality is a desirable condition to minimize the rectified torques due to linear vibrations. The ability to trim this parameter on the assembled gyroscope wheel of the prior art patent was limited because there was no hinge section which could be readily trimmed to change the compliance without contaminating or damaging the wheel and hinge assembly.

BRIEF DESCRIPTION OF THE PRESENT INVENTION

The present invention is directed to a hinge assembly which is insensitive to restraint changes due to spin axis accelerations. The hinge assembly has structural surfaces which are trimmable at the gyroscope wheel assembly to adjust the axial compliance of the gyroscope wheel thereby reducing the rectified torques due to linear acceleration.

Unlike the prior art, the invention provides a set of inner hinge flexures maintained in compression while another set is maintained in tension. As a result, for matched flexures there is no change in restraint. The present invention includes a structural element which is essentially only axially compliant. The surface of the structure can be readily machined or plated to make the axial compliance equal to the radial compliance.

The above-mentioned objects and advantages of the present invention will be more clearly understood when considered in conjunction with the accompanying drawings, in which:

DETAILED DESCRIPTION OF THE INVENTION

Figure 1:
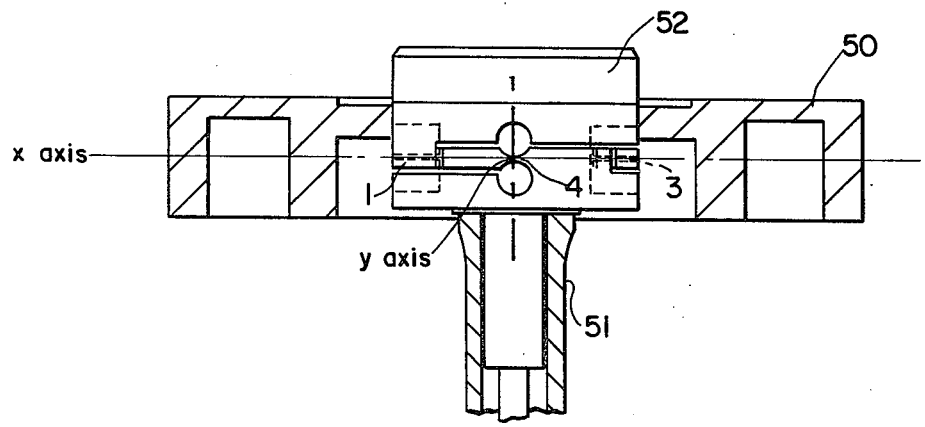
FIG. 1 is a cross-sectional view of a prior art gyroscope, similar to that described in mentioned U.S. Pat. No. 3,709,045.
Figure 4:
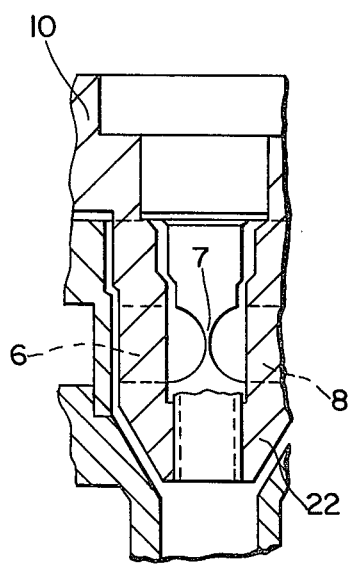
FIG. 4 is a partial cross sectional side view of the inner hinge assembly of the present invention.

Referring to FIG. 1, there is schematically shown a cross section of a free rotor universal joint suspended gyro similar to that described in U.S. Pat. No. 3,709,045. The illustrated gyroscope includes a rotor in the nature of an inertial flywheel 50, a drive shaft 51, and a universal joint hinge assembly 52. The other components of the gyroscope, for example the ball bearings for the drive shaft, the drive motor, the outer case and the like have been omitted because they form no part of the present invention.

In the operation of the gyroscope of FIG. 1, rotation is imparted from the drive shaft, through the hinge assembly and this causes the inertia flywheel to spin about the "Z" axis.

Figure 2:
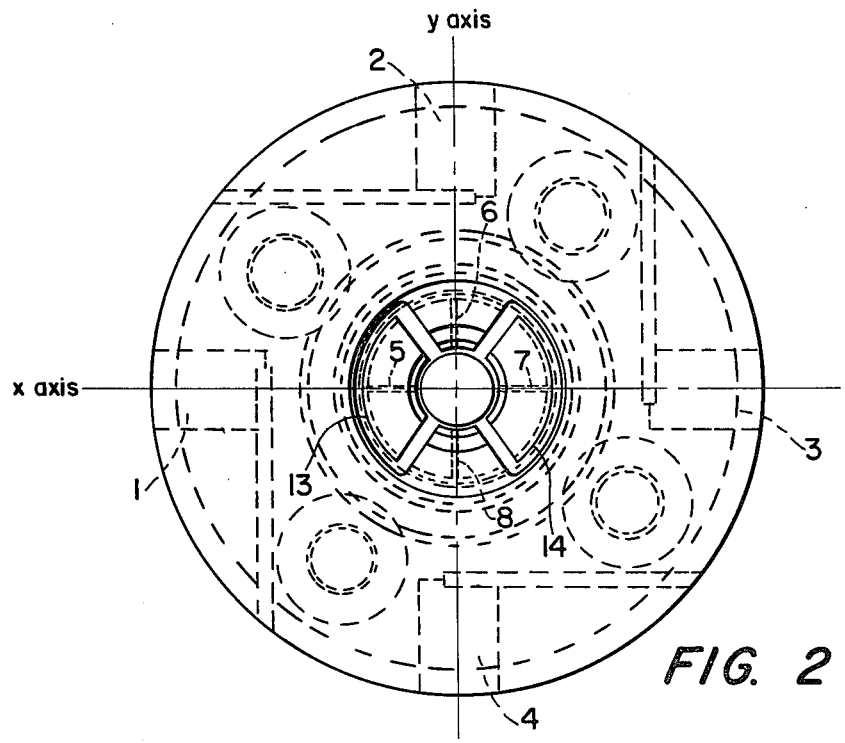
FIG. 2 is a top view of the present invention.
Figure 3:
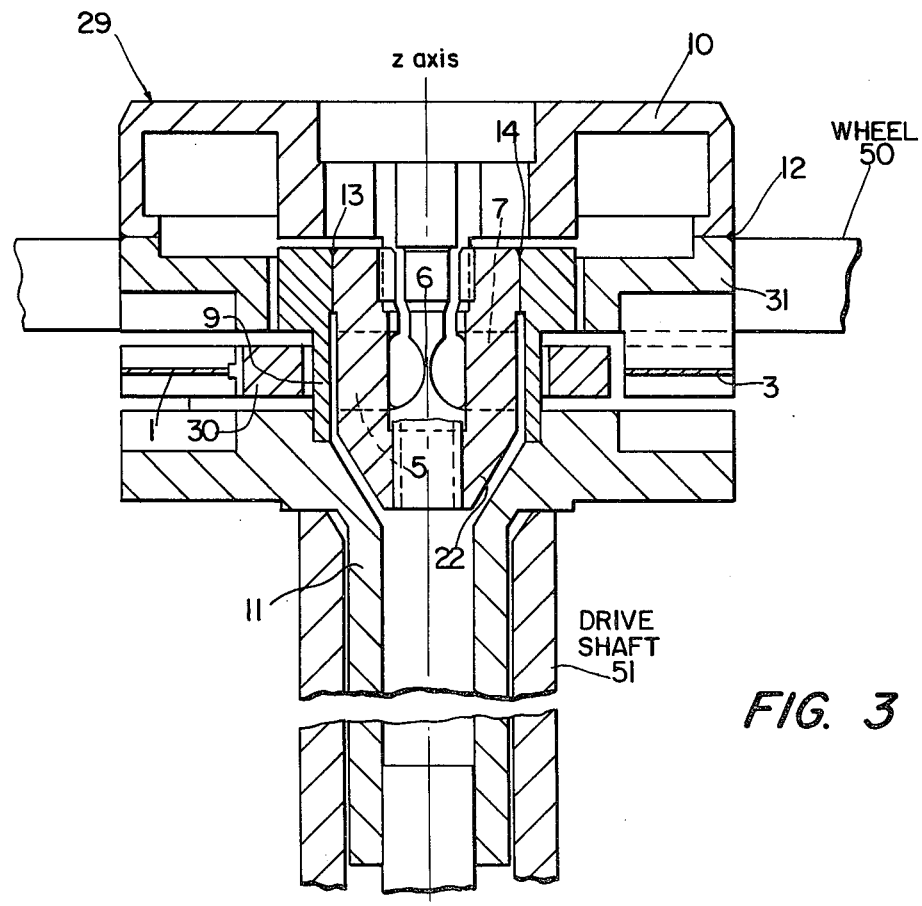
FIG. 3 is a cross sectional front view of the present invention.

Referring to FIGS. 2 and 3, the hinge assembly includes an outer hinge unit which includes upper gimbal 31, middle gimbal 30, lower gimbal 11, and sleeve 9. Sleeve 9 is welded or brazed to lower gimbal 11. Middle gimbal 30 is connected to the upper gimbal 31 through a pair of flexures 1 and 3, and the middle gimbal 30 is connected to the lower gimbal 11 through a pair of flexures 2 and 4 which are in quadrature to the first pair. Upper gimbal 31 connects to the flywheel 50 and lower gimbal 11 connects to drive shaft 51.

The hinge assembly also includes an inner hinge unit which includes upper gimbal 10 and inner gimbal 22. The inner gimbal 22 is connected to upper gimbal 10 through inner flexures 6 and 8. The inner gimbal 22 is connected to sleeve 9 of the outer hinge unit through flexures 5 and 7, which are welded or brazed over arc sections 13 and 14. The inner hinge unit is also connected to the outer hinge unit by a weld or braze around the circumference at 12.

Figure 5:
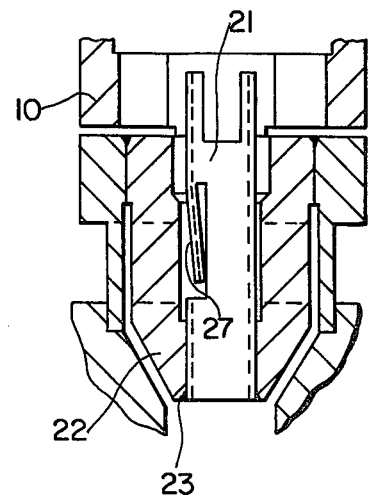
FIG. 5 is a partial cross sectional front view illustrating the inner hinge assembly and inner gimbal compensation weight holder of the present invention.

FIG. 5 shows the details of inner gimbal compensation weight holder 21 which is connected to inner gimbal 22 by a weld or braze as shown at 23. Weight holder 21 is a sleeve which is slotted to make a tab 27 which is pushed inward so that it can apply a radial spring force on the inner gimbal compensating weight 26 as shown in FIG. 7.

Figure 6:
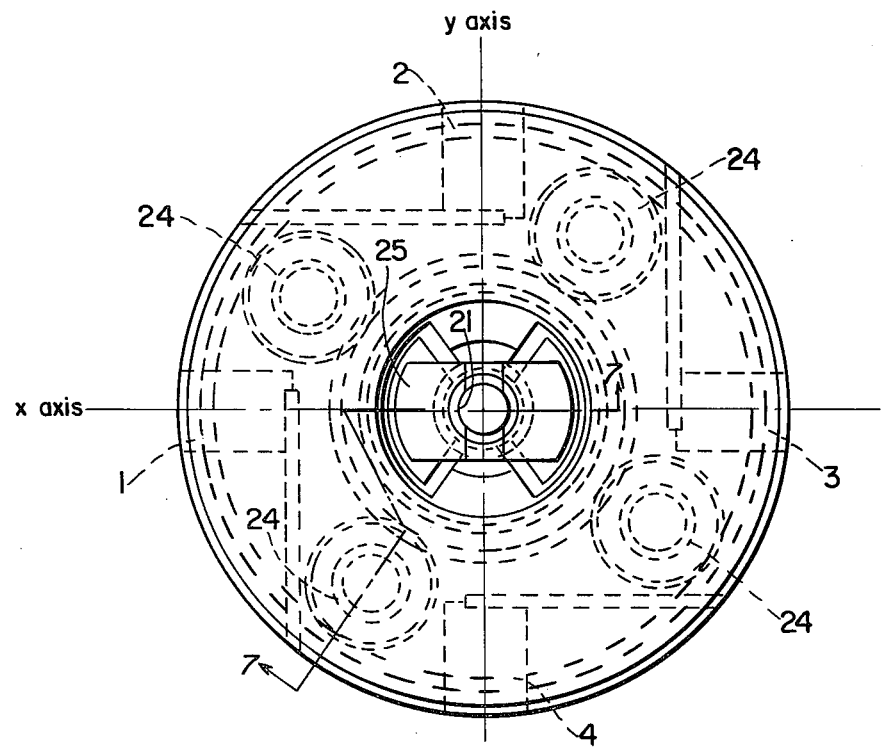
FIG. 6 is a top view illustrating the outer and inner gimbal weights included in the present invention.
Figure 7:
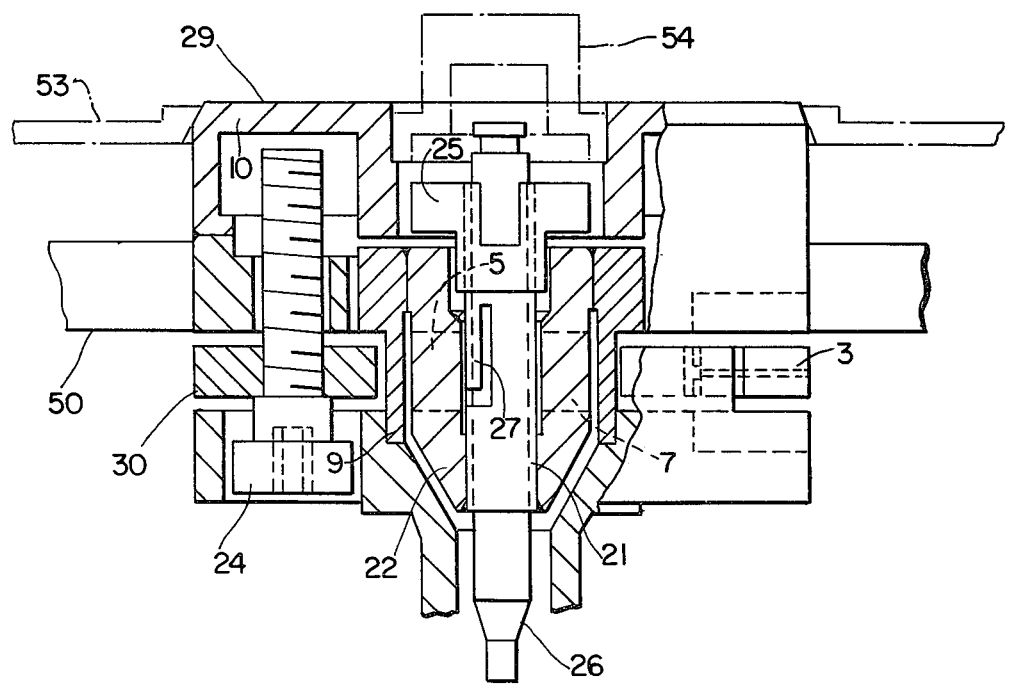
FIG. 7 is a partial cross sectional front view showing the inner and outer gimbal compensation weights incorporated in the present invention.

As shown in FIGS. 6 and 7, the inner gimbal compensation weights include weight 25 and weight 26. Weight 25 is used to achieve approximate balance. Weight 26 is selected to achieve the required inertia and is positioned within weight holder 21 to achieve proper balance.

The outer hinge unit gimbal is adjusted for balance and inertia by screws 24. Normally, four screws are used. These screws are threaded into gimbal 30. They are selected for weight and length to achieve the proper inertia and balance.

The inner and outer hinge assemblies are positioned so that drive shaft motions around the X axis cause gimbal 30 to rotate and drive shaft motions around the Y axis cause gimbal 22 to rotate. The positive spring torque due to flexures 1 and 3 of the outer hinge assembly and flexures 5 and 7 of the inner hinge assembly, as a result of rotation around the X axis, are compensated by the negative inertia torque due to gimbal 30 and the four screws 24 serving as gimbal weights. The positive spring torque due to flexures 2 and 4 of the outer hinge assembly and flexures 6 and 8 of the inner hinge assembly, as a result of angular motions around the Y axis, are compensated by the negative inertia torque due to gimbal 22, weight holder 21, weight 25 and weight 26.

The present hinge assembly, like that described in Pat. No. 3,709,045, is capable of being trimmed to compensate for spring rate torques, rectified torques due to gimbal imbalance and rectified torques due to angular input vibrations. However, the means for achieving this end is unique to the present invention. Upper gimbal 10 is essentially only axially compliant. The surface 29 of this gimbal can be readily machined or plated to make the axial compliance equal to the radial compliance. This may be simply performed by clamping the gyroscope wheel to a fixture. Seal plate 53 and seal plate 54 are inserted as shown in FIG. 7 to shield the internal mechanism from contamination by plating material or machined material.

If a lower cost device is desired, the present design may be modified if the errors due to angular vibrations are tolerable. In the alternate construction, the inner hinge can be rotated 90 degrees, so both the inner and outer hinge flexures attached to the wheel side are on a common axis and also the inner and outer hinge flexures attached to the shaft side are on a common axis. In this case, the screws 24 on the outer axis can be eliminated and the gimbal inertia can be compensated by using a heavier weight 26. This is similar to the arrangement described by U.S. Pat. No. 3,354,726.

In summary, the primary features of the present invention relate to a universal joint hinge assembly which has:

(a) A universal joint assembly which has a separate universal joint to support loads in an axial direction and also a separate universal joint to support loads in a radial direction, and whereby the axial support universal joint has one pair of flexures which is loaded in compression and one pair in tension. This will minimize the restraint changes due to spin axis accelerations.

(b) A structure that can be readily trimmed at the gyro wheel assembly to adjust the axial compliance to reduce the rectified torques due to linear accelerations.

It should be understood that the invention is not limited to the exact details of construction shown and described herein for obvious modifications will occur to persons skilled in the art.

I claim:

1. A gyroscope which includes a rotor, a shaft for driving said rotor about a spin axis, and a universal joint assembly having an inner hinge unit for supporting loads in an axial direction and an outer hinge unit for supporting loads in a radial direction, the outer hinge unit comprising:
   an outer upper gimbal connecting to the rotor,
   an outer middle gimbal, and
   an outer lower gimbal connecting to the shaft and having a sleeve portion,
   said outer middle gimbal having a first pair of outer flexures connecting to the outer upper gimbal, and
   a second pair of outer flexures connecting to the outer lower gimbal and being in quadrature with said first pair of outer flexures; and the inner hinge unit comprising:
   an inner upper gimbal, and
   an inner middle gimbal,
   said inner middle gimbal having a first pair of inner flexures connecting to the inner upper gimbal, and
   a second pair of inner flexures connecting to the outer lower gimbal through said sleeve portion of the outer lower gimbal and being in quadrature with said first pair of inner flexures, said inner upper gimbal being fixedly connected to said outer upper gimbal, whereby said first pair of inner flexures are loaded in compression; and
   said second pair of inner flexures are loaded in tension;
   thereby minimizing the restraint changes due to spin axis accelerations.

2. The structure set forth in claim 1, wherein said inner upper gimbal has a raised exposed surface, relative to the rotor permitting trimming of the assembly by machining or plating said exposed surface, for adjusting axial compliance and for making the axial compliance equal to the radial compliance in order to reduce rectified torques due to linear acceleration, and wherein said inner middle gimbal has a weight holder fixedly connected thereto, said weight holder having a first axially adjustable weight for achieving approximate balance and having a second axially adjustable weight for achieving required inertia and proper balance and having a radial spring tab arranged to apply a radial holding force on said second weight, and wherein said outer middle gimbal has four peripherally spaced screws for adjusting its balance and inertia, for ease of manufacture and overhaul, and for minimizing operation drift error.

3. The structure set forth in claim 2 wherein said inner upper gimbal has a first seal plate disposed radially inwardly of said raised exposed surface for shielding the inside of the inner upper gimbal and has a second seal plate disposed radially outwardly of said raised exposed surface for shielding the rotor to avoid contamination of the universal joint assembly by plating material or machined material and for ease of manufacture and overhaul and for sealing internal components of the gyroscope while retaining exposure of the raised surface for permitting trimming of the hinge assembly.

* * * * *